(12) United States Patent
Camalig et al.

(10) Patent No.: US 8,123,830 B2
(45) Date of Patent: Feb. 28, 2012

(54) FILTER ELEMENT WITH PARTICLE-TRAPPING CREVICE

(75) Inventors: Clifford Jayson Bringas Camalig, Singapore (SG); Asmin Buang, Singapore (SG)

(73) Assignee: Seagate Technology, Cupertino, CA (US)

( * ) Notice: Subject to any disclaimer, the term of this patent is extended or adjusted under 35 U.S.C. 154(b) by 323 days.

(21) Appl. No.: 12/581,545

(22) Filed: Oct. 19, 2009

(65) Prior Publication Data

US 2011/0089038 A1    Apr. 21, 2011

(51) Int. Cl.
*B01D 50/00*    (2006.01)

(52) U.S. Cl. ......... 55/385.6; 55/495; 55/529; 360/97.02
(58) Field of Classification Search ................. 55/385.6, 55/495, 528, 529; 360/97.02
See application file for complete search history.

(56) References Cited

U.S. PATENT DOCUMENTS 4,410,341 A * 10/1983 Edwards et al. ................ 55/482
(Continued)

*Primary Examiner* — Robert A Hopkins
(74) *Attorney, Agent, or Firm* — Braden Katteinrich

(57) ABSTRACT

A filter element includes a flow-through element and a floor element that abut one another to form a crevice along a crevice length between the flow-through element and the floor element. The crevice traps a portion of particles that become dislodged from the flow-through element.

20 Claims, 8 Drawing Sheets

U.S. PATENT DOCUMENTS

| | | |
|---|---|---|
| 6,473,264 B2 * | 10/2002 | Bae et al. .................. 360/97.02 |
| 6,999,273 B2 | 2/2006 | Tsang et al. |
| 7,110,215 B2 | 9/2006 | Hong et al. |
| 2001/0017744 A1 | 8/2001 | Bae et al. |
| 2003/0218829 A1 | 11/2003 | Hong et al. |
| 2004/0212920 A1 | 10/2004 | Tadepalli et al. |
| 2007/0056444 A1 | 3/2007 | Garikipati |
| 2007/0283809 A1 | 12/2007 | Boulay et al. |
| 2008/0047437 A1 | 2/2008 | Oo et al. |
| 2009/0015964 A1 | 1/2009 | Hong et al. |
| 2009/0073607 A1 | 3/2009 | Yu et al. |
| 2009/0183475 A1 | 7/2009 | Dauber et al. |

* cited by examiner

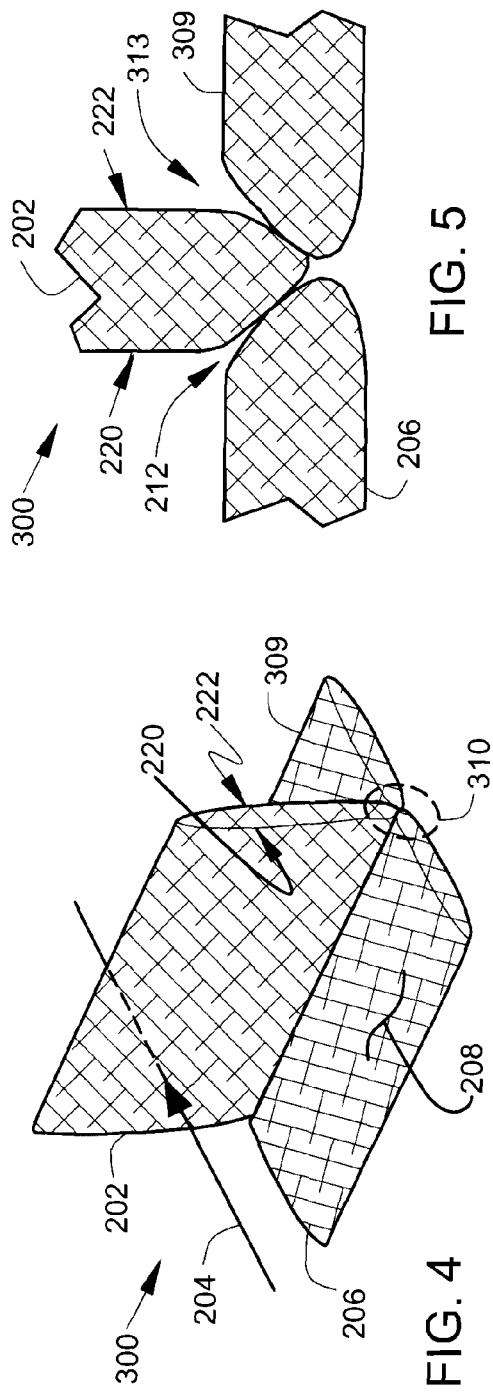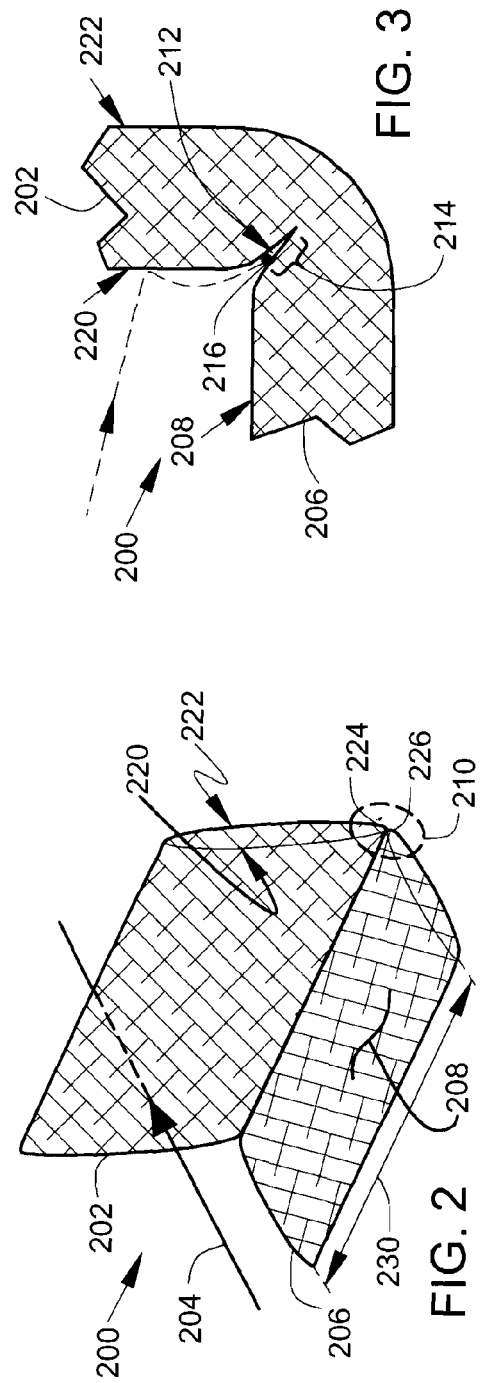

FILTER ELEMENT WITH PARTICLE-TRAPPING CREVICE

BACKGROUND

The present disclosure relates to particle filters for enclosed electromechanical devices such as data storage drives. Contaminating particles are present inside data storage drives and damage discs and sliders when the particles pass through the sliding interface between the disc and the slider. Particle filters in the data storage drive filter out some, but not all of the particles.

Embodiments in the present disclosure provide solutions to these and other problems, and offer other advantages over the prior art.

SUMMARY

Disclosed is a filter element. The filter element comprises a flow-through element. The flow-through element is adapted to filter a recirculation flow in a sealed electromechanical assembly.

The filter element comprises a floor element. The floor element comprises a perpendicular-facing surface disposed adjacent the flow-through element.

The flow-through element and the floor element abut to form a first crevice along a crevice length between the flow-through element and the floor element. The first crevice traps a first portion of particles that become dislodged from the flow-through element.

Other features and benefits that characterize various aspects of the present disclosure will be apparent upon reading the following detailed description and review of the associated drawings.

BRIEF DESCRIPTION OF THE DRAWINGS

FIGS. 2-3 illustrate a first filter element that comprises a flow-through element and floor element that abut to form a crevice.

FIGS. 4-5 illustrate second filter element that includes first and second floor elements, forming two crevices.

DETAILED DESCRIPTION OF ILLUSTRATIVE EMBODIMENTS

Figure 1:
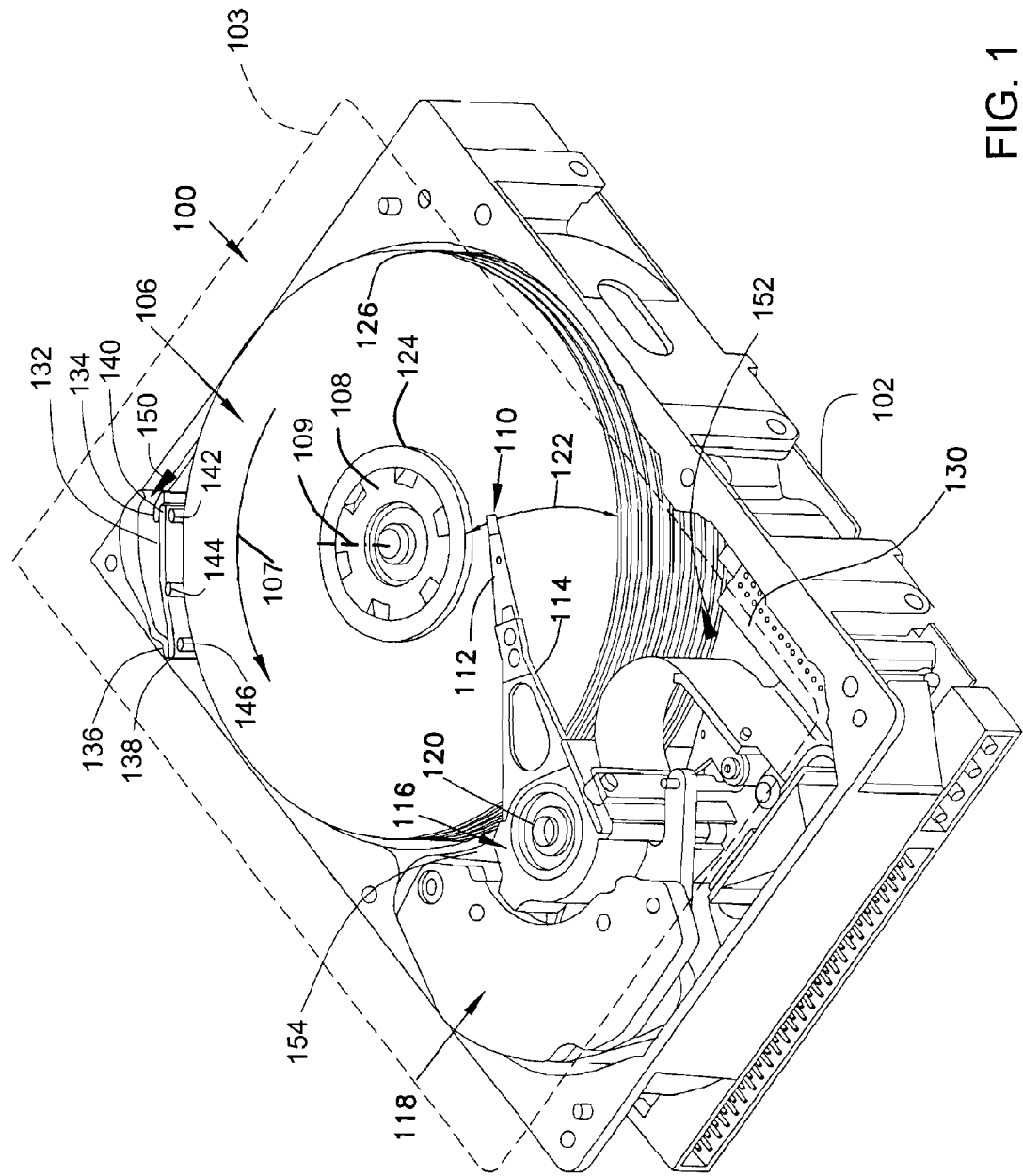
FIG. 1 is an exploded view of a disc drive.

In the embodiments described below, specially shaped filter elements in sealed electromechanical devices such as hard disk drives capture unwanted particles. The filter element includes a flow-through element and a floor element that is arranged perpendicular to the flow-through element. The flow-through element and the floor element have tapered or curved shaped edges and are positioned such that the edge shapes abut one another to form a narrow crevice that permanently traps unwanted particles. The flow-through element temporarily captures some particles moving in a recirculation airflow when discs in the disc drive are spinning (rotating). When the disks stop spinning, particles drop from the flow-through element onto the floor element and into the crevice. The particles are permanently trapped in the crevice. The crevice between the flow-through element and the floor element permanently removes particles from the recirculation airflow. The permanently trapped particles are thus prevented from causing any further damage at a sliding interface between a disc and a slider.

Particles are a problem in the hard disk drive industry that affects quality and reliability performance. During operation, airborne particles from assembly processes or particles dislodged from parts exposed to extreme temperatures can hit the media or the slider, causing slider or disk abrasions resulting in head crashes or hard defects in the storage media on the disc.

Many failures are due to relatively large aluminum particles from an aluminum base of the disc drive. Other sources of failures are stainless steel particles from assembled parts, aluminum oxide particles from sliders and head components, and PEEK thermoplastic resin particles from plastic parts. These particle components are very hard to control.

A functional doping test measures particle robustness for a particular disc drive design. Particles used in the doping test are selected to have sizes and shapes of usual sources of media defect failures. One milligram of particles is doped inside a test drive, and then contact start stop (CSS) agitation is performed at least 10 times followed by full pack sequential read to count new media defects created by particle damage. The total number of the new media defects is used as a metric to evaluate filter element performance.

In hard disk drives with more than one head and media interface, the particle robustness performance differs with the locations of the sliding interfaces. The surfaces with narrower flow channels have higher particle failures primarily because the particle can bounce more in such narrow channels. Testing of filter performance includes testing of multiple locations of sliding interfaces.

The filter element is positioned within the hard disk drive where there is an accessible high airflow during operation to improve filtration performance.

It is found that current designs of recirculation filters only temporarily trap airborne particles larger than the filter mesh. Instead of capturing the large particle permanently, the large particle is only temporarily trapped on the surface of the filter while recirculation airflow is present. Poor adhesion makes the larger particles vulnerable to external shock that can dislodge the particles and make them airborne again, particularly after the disc drive is shut off and the discs are no longer producing recirculation airflow. Larger particles can also hit the filter wall and bounce back.

A capture efficiency for the presently disclosed filter element is better as compared to upright rectangular recirculation filters primarily because it will permanently capture particles that would be only temporarily captured in the traditional filter.

Sample disc drives with and without the floor element and crevice were tested using the functional doping test and the results are described below in connection with FIGS. 13-14.

The quantity of particles deposited on a disc after functional doping also shows fewer particles as described below in connection with FIGS. 11-12.

FIG. 1 is an exploded view of a disc drive 100 in which the presently disclosed filter elements are useful. Disc drive 100 includes a housing with a base 102 and a top cover (shown at dotted line 103). The base 102 and top cover 103 enclose moving components in the disc drive 100 in a sealed electromechanical assembly that is sealed against the entrance of dust and other particles.

Disc drive 100 further includes a disc pack 106, which is mounted on a spindle motor (not shown) by a disc clamp 108. Disc pack 106 includes a plurality of individual discs, which are mounted for co-rotation in a direction 107 about a central axis 109. Each disc surface has an associated disc head slider 110 which is mounted to disc drive 100 for communication with a disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

The disc head sliders 110 have sliding (air bearing) interfaces with the individual discs in the disc pack 106. The rotation of the disc pack 106 generates a recirculation flow inside the housing of the disc drive 100. The sliding interfaces are subject to damage when particles in the recirculation flow pass through the sliding interface. A path of recirculation flow inside the disc drive 100 passes through a filter element 132. The filter element 132 filters particles from the recirculation flow so that the particles do not reach the sliding interfaces where the particles could damage the sliders 110 or the surface of the discs in the disc pack 106. Recirculation flow passes through path locations 150, 152, 154, and a filter element can be placed at any location along the recirculation flow path.

The filter element 132 includes a first mounting edge 138 that mounts to a first mounting wall 136. The filter element 132 includes a second mounting edge 140 that mounts to a second mounting wall 134. The first and second mounting walls 134, 136 are protrusions that are part of the base 102. Pins 142, 146, 148 are provided to secure the filter element 132 in a desired position. The pins 142, 146 comprise compressive components that compress the filter element 132 against the mounting walls 134, 136. The compression of the mounting edges 138, 140 against the mounting walls 134, 136 forms an effective seal that limits bypass air flow around the mounting edges 138, 140. The compression of the mounting edges 138, 140 secures the filter element 132 to the base 102.

FIG. 2 illustrates a first filter element 200. The filter element 200 comprises a flow-through element 202 that filters a recirculation flow 204 in a sealed electromechanical assembly (such as the disc drive 100 in FIG. 1). The flow-through element 202 comprises an inlet surface 220 for receiving the flow 204, that is contaminated with particles, and an opposite outlet surface 222 that expels the flow 204. According to one aspect, the outlet surface comprises a surface area that comprises at least 1.3 square centimeters. The flow-through element 202 comprises a lower rim 224. The lower rim 224 has a tapered or rounded shape.

The filter element 200 comprises a floor element 206. The floor element 206 rests on a base (such as base 102 in FIG. 1) which inhibits air flow through the floor element. The floor element 206 has a perpendicular-facing major surface 208 that is perpendicular to the flow-through element. The floor element 206 comprises a proximal rim 226. The proximal rim 226 has a tapered or rounded shape. The lower rim 224 is adjacent the proximal rim 226. The lower rim 224 and the proximal rim 226 abut one another to form a crevice 212 (described in more detail below in connection with FIG. 3). The crevice 212 permanently traps a first portion of particles that become dislodged from the inlet surface 220.

The major surface 208 is disposed adjacent the flow-through element 202. According to one aspect, the major surface 208 comprises a particle trapping surface that traps a second portion of particles that become dislodged from the inlet surface 220. As illustrate in FIG. 2, the filter element 200 has a uniform cross-section along a body length 230 of the filter element 200. The filter element 200 comprises a porous fabric of electrostatic fibers or other known filter media used in disc drives. According to one aspect, the filter element 200 comprises a non-woven fabric. A region 210 of the filter element 200 is described in more detail below in connection with an enlarged drawing in FIG. 3.

As illustrated in FIG. 3, the flow-through element 202 and the floor element 206 abut to form a first crevice 212 along a crevice length 214 between the flow-through element 202 and the floor element 206. The first crevice 212 is formed by curved or taper portions of the flow-through element 202 and the floor element 206. The first crevice 212 traps a first portion of the particles (such as particle 216) that become dislodged from the flow-through element 202. As best seen in FIG. 3, the flow-through element 202 and the floor element 206 are formed of a single piece of fabric that has a fold that forms the first crevice 212. As described below in connection with FIG. 4-5, an addition floor element 309 can be used adjacent an outlet surface 222.

FIGS. 4-5 illustrate a filter element 300 that is similar to the filter element 200 shown in FIGS. 2-3, except that the filter element 300 includes a second floor element 308 that is positioned adjacent an outlet side 222 of the flow-through element 202, and the floor elements 206 and 309 are separate components from the flow-through element 202. Reference numbers used in FIGS. 4-5 that are the same as reference numbers used in FIGS. 2-3 identify the same or similar features and elements. As illustrated in FIG. 5, the filter element 300 includes a crevice 212 adjacent an inlet surface 220, and includes a crevice 313 adjacent an outlet surface 222. As illustrated in FIG. 5, the abutting surfaces of floor elements 206, 309 are attached to surfaces of the flow-through element 202 by non-outgassing adhesive or other attachment method.

Figure 6:
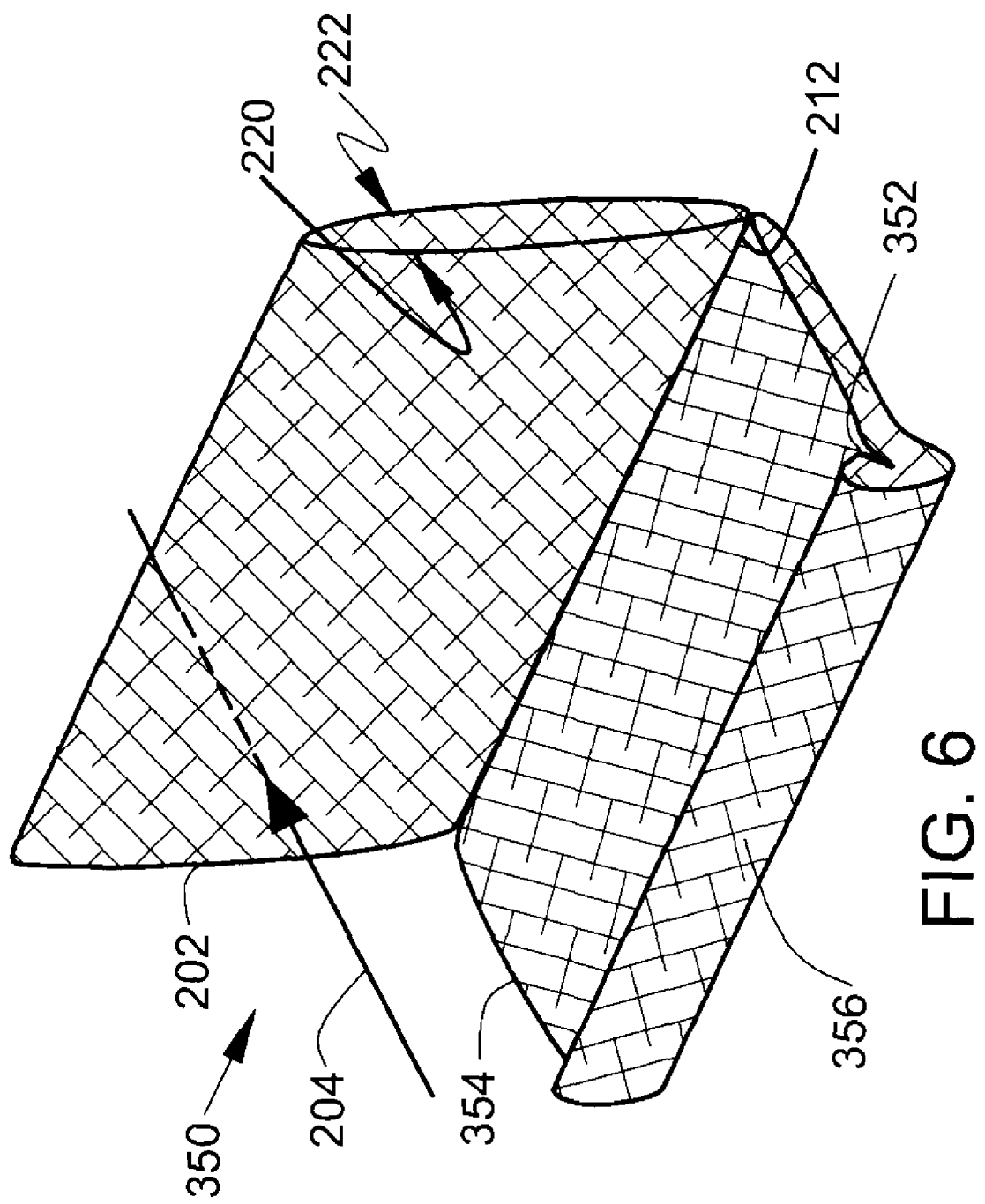
FIG. 6 illustrates a filter element that includes a floor element with a folded distal edge that forms a crevice.

FIG. 6 illustrates a filter element 350 that is similar to the filter element 200 shown in FIGS. 2-3, except that the filter element 350 includes an additional crevice 352 in a floor element 354. Reference numbers used in FIG. 6 that are the same as reference numbers used in FIGS. 2-3 identify the same or similar features and elements. The additional crevice 352 is formed, as illustrated, by providing a fold along a distal edge 356 of the floor element 354. The additional crevice 352 is a crevice which permanently traps particles.

Figure 7:
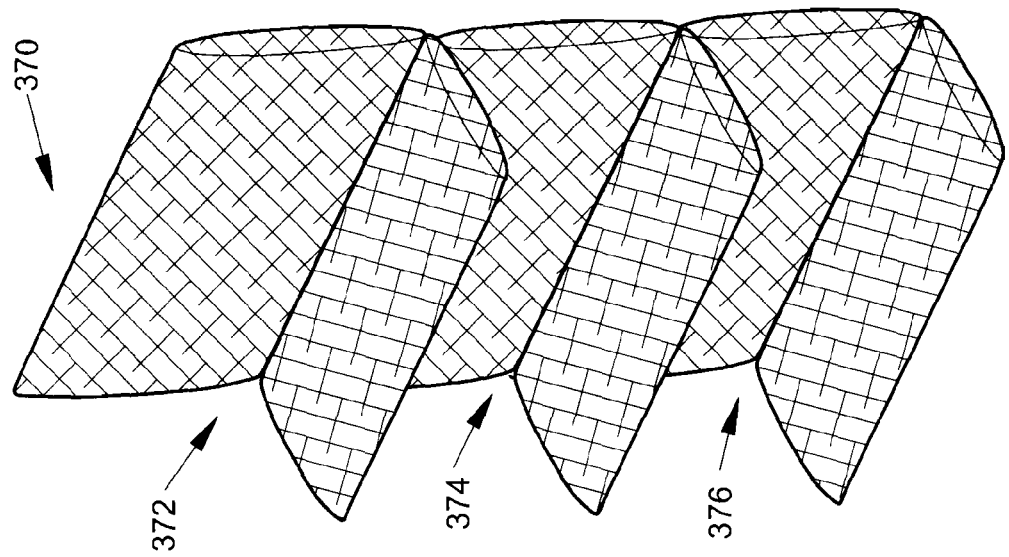
FIG. 7 illustrates a filter element that comprises multiple smaller filter elements such as the filter element shown in FIGS. 2-3.

FIG. 7 illustrates a filter element 370 that comprises multiple smaller filter elements 372, 374, 376. Each of the multiple smaller filter elements 372, 374, 376 comprises a filter element such as filter element 200 shown in FIGS. 2-3. The filter element 370 provides an increased total crevice length to enhance permanent particle capture capability. In FIG. 7, a floor element of filter element 372 functions as a ceiling element for filter element 374, and a floor element of filter element 374 functions as a ceiling element for filter element 376. The availability of both floor and ceiling element functions permits mounting upside down without losing particle trapping capabilities of the crevices.

Figure 8:
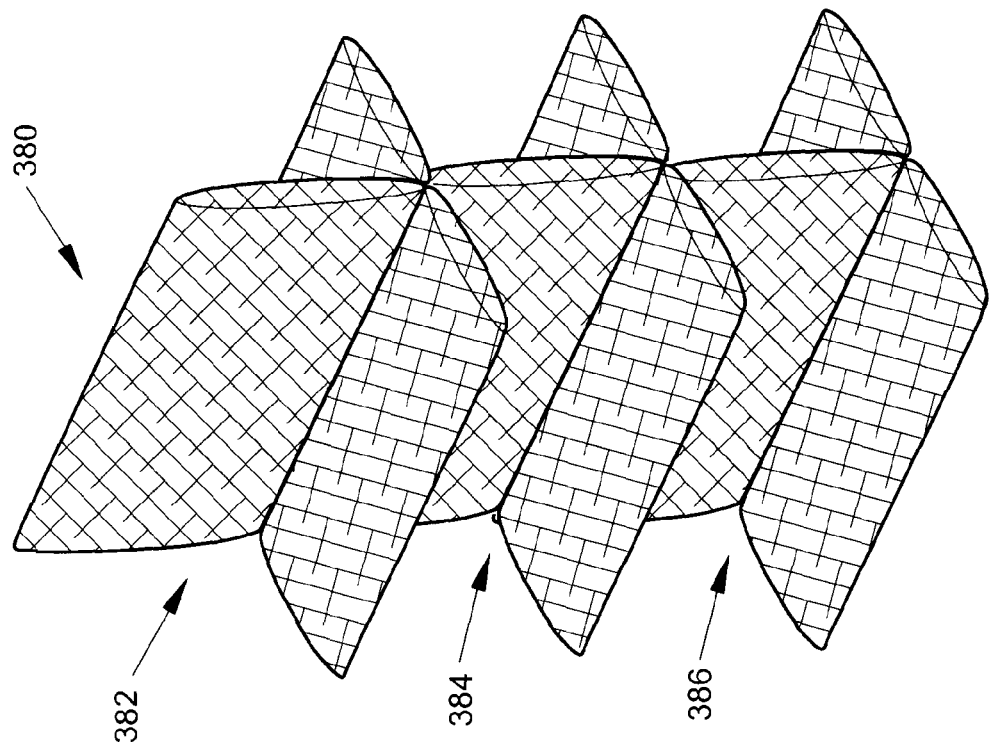
FIG. 8 illustrates a filter element that comprises multiple smaller filter elements such as filter element shown in FIGS. 4-5.

FIG. 8 illustrates a filter element 380 that comprises multiple smaller filter elements 382, 384, 386. Each of the multiple smaller filter elements 382, 384, 386 comprises a filter element such as filter element 300 shown in FIGS. 4-5. The filter element 370 provides an increased total crevice length to enhance permanent particle capture capability on both inlet and outlet sides of the flow-through elements. In FIG. 8, a floor element of filter element 382 functions as a ceiling element for filter element 384, and a floor element of filter element 384 functions as a ceiling element for filter element 386. The availability of both floor and ceiling element functions permits mounting upside down without losing particle trapping capabilities of the crevices.

Figure 9:
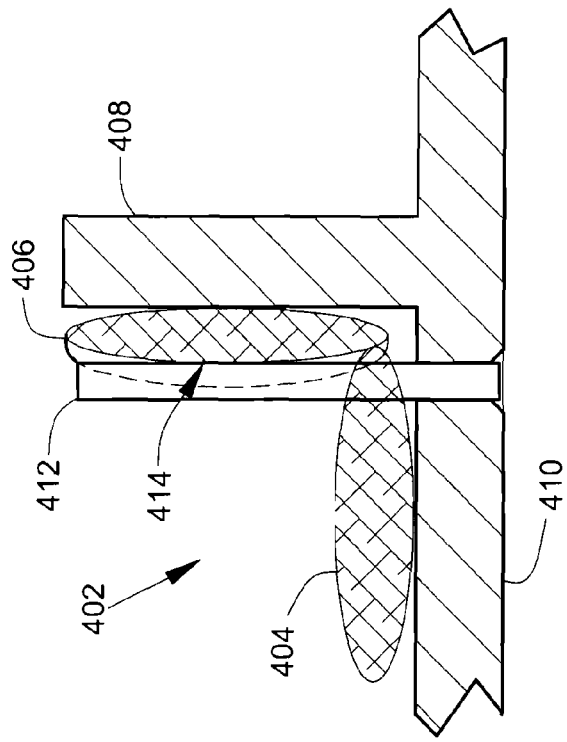
FIG. 9 illustrates a mounting pin for a filter element.

FIG. 9 illustrates a filter element 402 (such as filter element 200 in FIG. 2) that comprises a floor element 404 and a flow-through element 406. The filter element 402 is mounted to a mounting wall 408 (such as mounting walls 134, 136 in FIG. 1). The mounting wall 408 is a part of a base 410 (such as base 102 in FIG. 1). A pin 412 retains the flow-through element 406 in place by compression of a portion of the flow-through element 406 between the pin 412 and the mounting wall 408. The flow-through element 406 is first compressed toward the mounting wall 408 using a tool, and then the pin 412 is inserted in the base 410 as illustrated, forming a puncture hole through the floor element 404. The tool is removed, and the pin 412 functions as a compression component that mounts a mounting edge 414 to the mounting wall 408. Multiple pins can be used to mount multiple mounting edges to multiple mounting walls as shown in FIG. 1. According to one aspect, non-outgassing adhesives can be used in addition to mounting pins to secure the filter element to walls in a disc drive.

Figure 10:
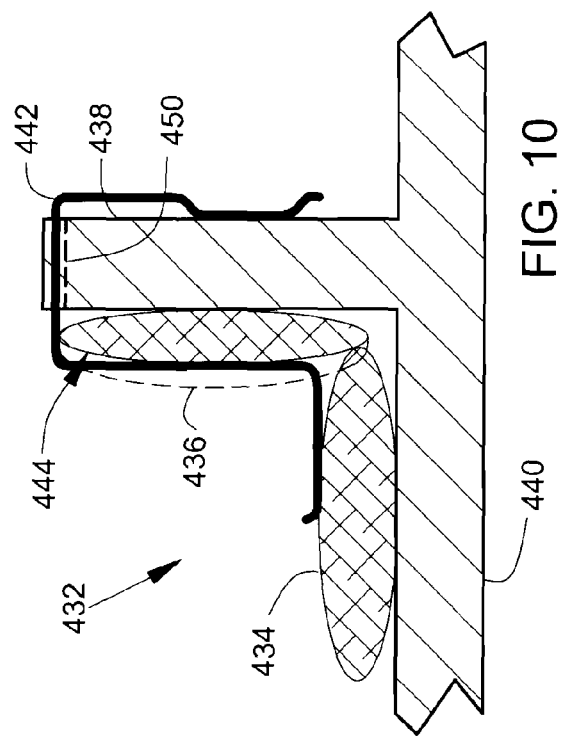
FIG. 10 illustrates a mounting clip for a filter element.

FIG. 10 illustrates a filter element 432 (such as filter element 200 in FIG. 2) that comprises a floor element 434 and a flow-through element 436. The filter element 432 is mounted to a mounting wall 438 (such as mounting walls 134, 136 in FIG. 1). The mounting wall 438 is a part of a base 440 (such as base 102 in FIG. 1). A spring wire clip 442 retains the flow-through element 436 in place by compression of a portion of the flow-through element 436 between the spring wire clip 442 and the mounting wall 438. The flow-through element 436 is first compressed toward the mounting wall 438 using a tool, and the spring wire clip 442 is inserted in a slot 450 in the base 440 as illustrated, compressing the floor element 434. The tool is removed, and the spring wire clip 442 functions as a compression component that mounts a mounting edge 444 to the mounting wall 438. Multiple spring wire clips can be used to mount multiple mounting edges which are shown in FIG. 1. According to one aspect, non-outgassing adhesive can be used to secure the spring wire clip in the slot 450. As an alternative to the spring wire clip 442, a similarly shaped sheet metal spring clip can also be used to provide the compression.

Figure 11:
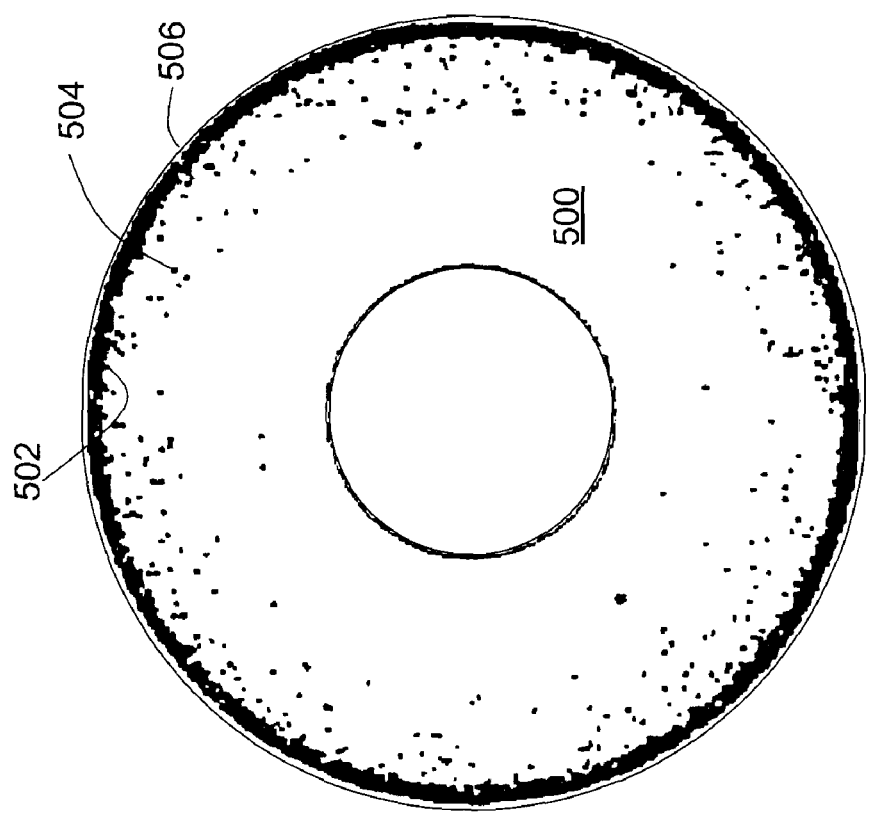
FIG. 11 illustrates a plot of particle deposits after a functional doping test in which a crevice is not provided in a filter element.

FIG. 11 illustrates a plot of measured particle deposits (such as particles 502, 504) on a disc 500 after completion of a functional doping test in a disc drive in which a filter element is provided with a flow-through element, but is not provided with a crevice between a floor element and flow-through element. As can be seen by inspection of FIG. 11, there are a large number of particles deposited, particularly near a peripheral rim 506.

Figure 12:
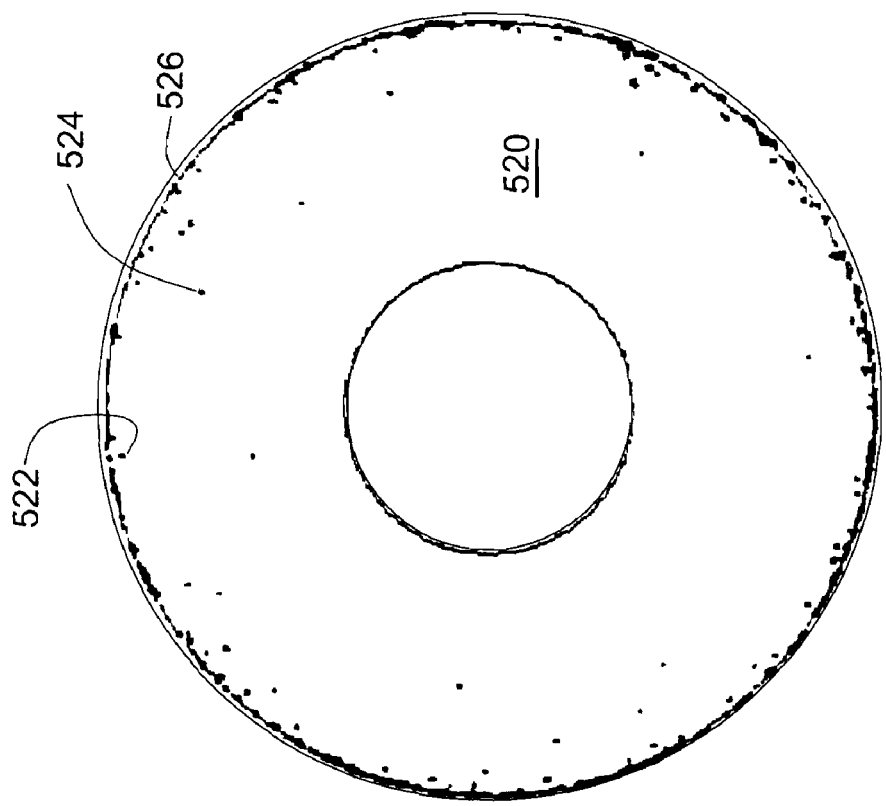
FIG. 12 illustrates a plot of particle deposit after a functional doping test in which a filter element is provided with a crevice between a floor element and flow-through element.

FIG. 12 illustrates a plot of measured particle deposits (such as particles 522, 524) on a disc 520 after completion of a functional doping test in a disc drive in which a filter element is provided with a crevice between a floor element and flow-through element. As can be seen by inspection of FIG. 12, there are a small number of particles deposited. There is only limited build-up of particles near a peripheral rim 526 in comparison to FIG. 11. By comparing FIGS. 11 and 12, it can be seen that the use of a filter element that includes a crevice between a flow-through element and floor element greatly reduces the number of particles on a disc in disc drive.

Figure 13:
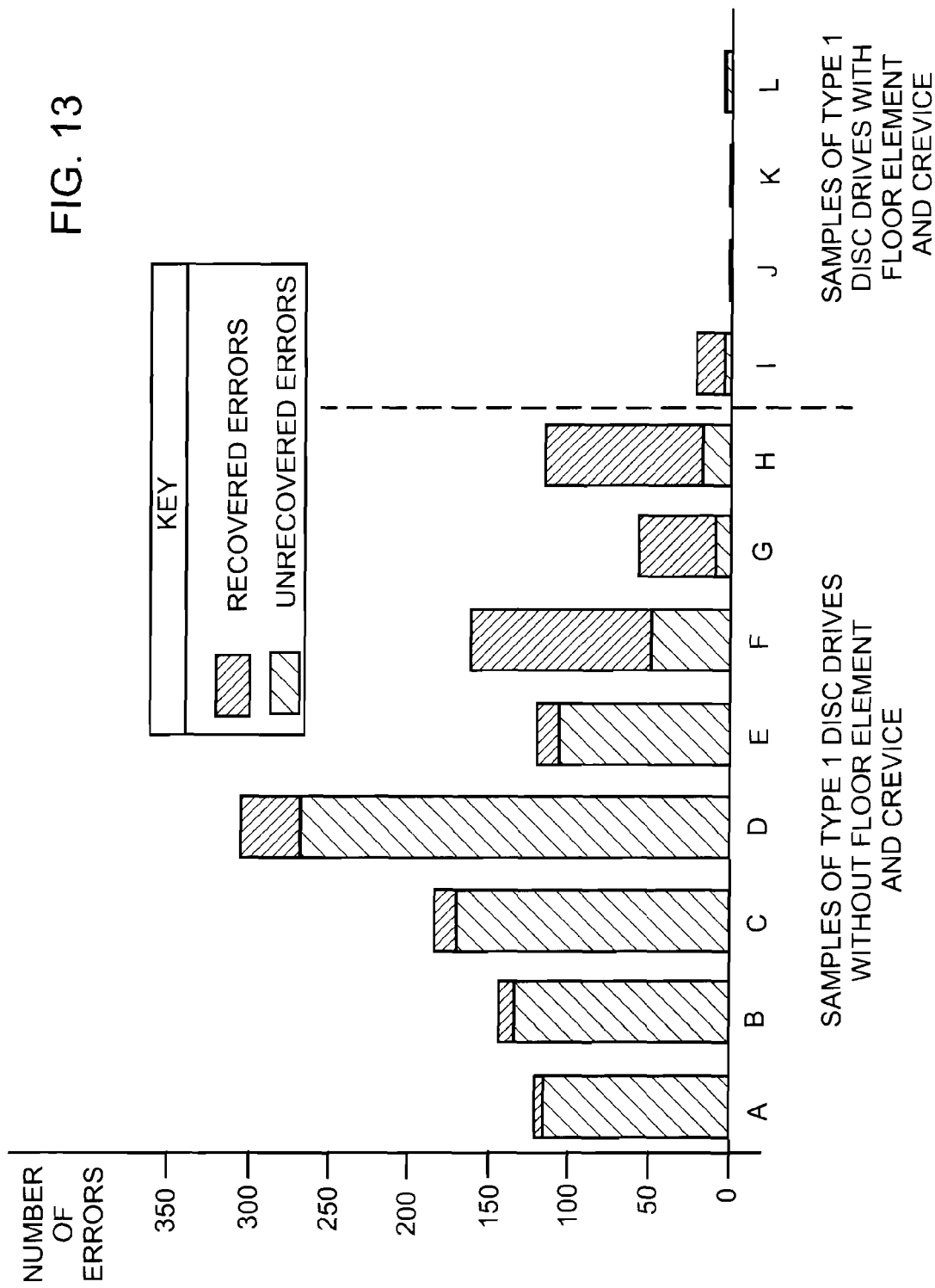
FIG. 13 illustrates a bar graph of data errors in sample disc drives of a first type after a functional doping test.

FIG. 13 illustrates a bar graph of measured data errors in sample disc drives of a first type (type 1) after completion of a functional doping test. In sample drives A, B, C, D, E, F, G, H, a filter element is provided that does not have a crevice between a floor element and flow-through element. In sample drives I, J, K, L, a filter element is provided that has a crevice between a floor element and flow-through element. As can be seen by inspection of FIG. 13, the use of a filter element that includes a crevice between a flow-through element and floor element greatly reduces the number of measured data errors in the type 1 disc drive.

Figure 14:
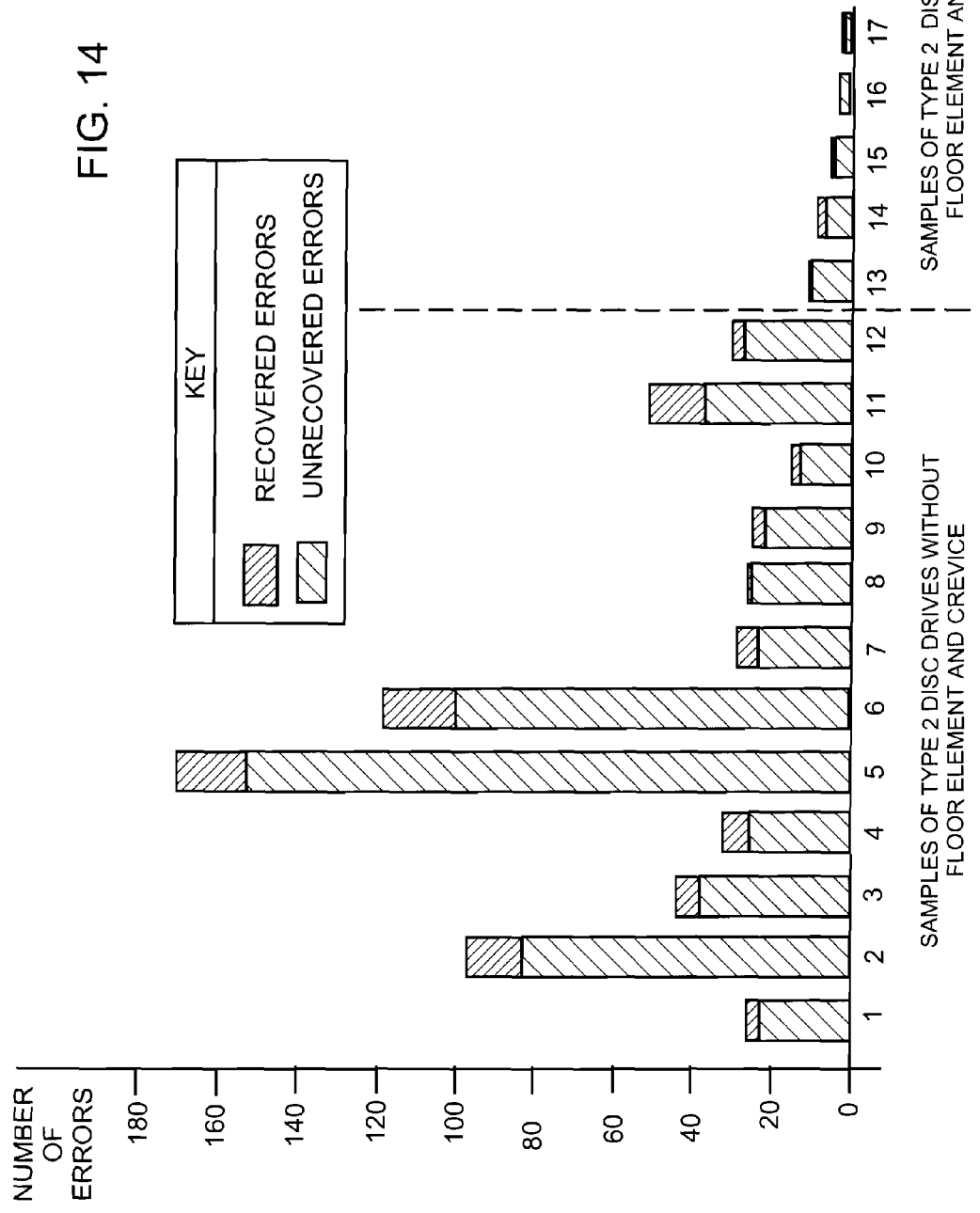
FIG. 14 illustrates a bar graph of data errors in sample disc drives of a second type after a functional doping test.

FIG. 14 illustrates a bar graph of measured data errors in sample disc drives of a second type (type 2) after completion of a functional doping test. In sample drives 1-12, a filter element is provided that does not have a crevice between a floor element and flow-through element. In sample drives 13-17, a filter element is provided that has a crevice between a floor element and flow-through element. As can be seen by inspection of FIG. 13, the use of a filter element that includes a crevice between a flow-through element and floor element greatly reduces the number of measured data errors in the type 2 disc drive.

It is to be understood that even though numerous characteristics and advantages of various aspects of the disclosure have been set forth in the foregoing description, together with details of the structure and function, this disclosure is illustrative only, and changes may be made in detail, especially in matters of structure and arrangement of parts within the principles of the present disclosure to the full extent indicated by the broad general meaning of the terms in which the appended claims are expressed. It will be appreciated by those skilled in the art that the teachings of the present disclosure can be applied to many types of sealed electromechanical devices, without departing from the scope and spirit of the present disclosure.

What is claimed is:

1. A filter element, comprising:
    a flow-through element adapted to filter a recirculation flow; and
    a floor element abutted to the flow-through element to form a first crevice that traps particles that fall from the flow-through element.

2. The filter element of claim 1, wherein the floor element comprises a particle trapping surface that is adapted to trap particles that fall from the flow-through element.

3. The filter element of claim 1, further comprising:
    a ceiling element that faces the floor element and that forms a second crevice with the flow-through element, the ceiling element positioned to trap particles that become dislodged from the flow-through element.

4. The filter element of claim 1 wherein the flow-through element and the floor element are formed of a single piece of fabric that has a fold that forms the first crevice.

5. The filter element of claim 1 wherein the floor element comprises a fold along a distal edge of the floor element that forms a second crevice.

6. A filter element, comprising:
- a flow-through element having an inlet surface adapted to receive a flow contaminated with particles, an outlet surface adapted to expel the flow, and a tapered lower rim; and
- a floor element having a tapered proximal rim positioned adjacent the tapered lower rim to form a crevice.

7. The filter element of claim 6, wherein the floor element includes an upward facing surface having a particle trapping surface.

8. The filter element of claim 6 further comprising a uniform cross-section along a body length of the filter.

9. The filter element of claim 6 further comprising a non-woven fabric of electrostatic fibers.

10. The filter element of claim 6, further comprising:
- a ceiling element having a downwardly facing particle-trapping surface that forms a second crevice with an upper rim of the flow-through element.

11. The filter element of claim 6 wherein the outlet surface comprises a surface area that comprises at least 1.3 square centimeters.

12. The filter element of claim 6 wherein the floor element comprises a fold along a distal edge of the floor element that forms a second crevice.

13. The filter element of claim 6 wherein the floor element is positioned perpendicular to the filter-through element.

14. A sealed electromechanical assembly, comprising:
- a path of recirculation flow contaminated by particles inside the sealed electromechanical assembly; and
- a filter element including:
  - a flow-through element adapted to filter the recirculation flow; and
  - a floor element abutted to the flow-through element to form a crevice that traps particles that fall from the flow-through element.

15. The sealed electromechanical assembly of claim 14 further comprising:
- a disc that is adapted to rotate to generate the recirculation flow; and
- a slider that has a slidable interface with the disc that is subject to damage when the particles pass through the slidable interface.

16. The sealed electromechanical assembly of claim 15 further comprising:
- a base that includes first and second mounting walls; and
- the filter element comprises first and second mounting edges that are mounted to the respective first and second mounting walls.

17. The sealed electromechanical assembly of claim 16 and further comprising non-outgassing adhesive that mounts the first and second mounting edges to the respective first second walls.

18. The sealed electromechanical assembly of claim 17 and further comprising a compression component that mounts the first and second mounting edges to the respective first second walls by compression.

19. The sealed electromechanical assembly of claim 18 wherein the compression component comprises a spring clip.

20. The sealed electromechanical assembly of claim 18 wherein the compression component comprises a pin that compresses the flow-through element.

* * * * *